United States Patent Office.

EDUARD RUDOLF KOBERT, OF DORPAT, RUSSIA.

PROCESS OF PRECIPITATING BLOOD BY PYROGALLIC ACID.

SPECIFICATION forming part of Letters Patent No. 541,096, dated June 18, 1895.

Application filed April 17, 1895. Serial No. 546,114. (No specimens.) Patented in Germany October 16, 1891, No. 70,841, and in England November 16, 1894, No. 19,859.

*To all whom it may concern:*

Be it known that I, EDUARD RUDOLF KOBERT, a subject of the King of Prussia, German Emperor, residing at Dorpat, Russia, have invented a new Process for Manufacturing a Blood-Forming Tonic, (for which I have obtained Letters Patent in Germany, No. 70,841, dated October 16, 1891, and in Great Britain, No. 19,859, dated November 16, 1894,) of which the following is a clear and exact specification.

My invention consists of a new process for manufacturing a blood-forming tonic. This iron preparation or blood-forming tonic is especially well adapted for reabsorption by the patient, through the intestinal canal, of the iron contained in the preparation and is obtained according to the present invention by the treatment of blood with pyrogallic acid as hereinafter will be fully described.

Fresh defibrinated blood, suitably diluted with water is mixed with a cold saturated solution of pyrogallic acid, equal parts of the acid solution and of the blood being sufficient. A voluminous precipitate is produced, which is then separated and washed out until all traces of the pyrogallic acid are removed. It is desirable to wash the precipitate finally with alcohol. The precipitate thus washed is afterward dried or allowed to dry, and the red brown substance obtained is the iron preparation hereinbefore referred to. This iron preparation obtained in accordance with my invention forms a red brown powder and contains about 8.1 per cent. hydrogen, 47.5 per cent. of carbon, and about twelve per cent. of nitrogen. The same is insoluble in water and differs very materially not only from hæmoglobin and methæmoglobin which contain from fifty-three to fifty-four per cent. of carbon, but also from hæmatin with about 8.8 per cent. of iron and as much nitrogen. It also differs from other iron preparations, such as iron albuminates, iron peptonates and from the ordinary hæmoglobin preparations by its greater capacity for utilization of the iron it contains and by the greater digestibility with less effort of the digestive organs, because it has already undergone the reducing or deoxidizing process which the said preparations have to undergo in the intestinal canal owing to the action of the reducing or deoxidizing intestinal bacteria, which are always present.

An intimate mixture of hæmoglobin with water shows in the spectrum the absorption bands of the hæmoglobin between the lines D and E. Contrary to this an intimate mixture of water with the product obtained as above described does not show such absorption bands between the spectrum lines D and E. Furthermore hæmoglobin and hæmatin possess a disagreeable taste, while the product obtained according to the present invention is practically without taste.

Having thus described my invention, what I claim, and desire to secure by Letters Patent, is—

1. A method of obtaining blood-forming iron preparation consisting in precipitating such substance out of blood by the action of pyrogallic acid and separating the precipitate, substantially as described.

2. A method of obtaining blood-forming iron preparation consisting in precipitating such substance out of blood by the action of pyrogallic acid and separating the precipitate and washing the same with alcohol, substantially as described.

3. A method of obtaining blood-forming iron preparation consisting in precipitating such substance out of blood by the action of pyrogallic acid and separating the precipitate and drying the same, substantially as described.

In testimony whereof I have signed my name in the presence of two subscribing witnesses.

EDUARD RUDOLF KOBERT.

Witnesses:
  OSCAR TURK,
  WITEOW SCHULZ.